G. FOUILLARON.
BELT.
APPLICATION FILED JAN. 22, 1906.
902,224.
Patented Oct. 27, 1908.
Fig.1.
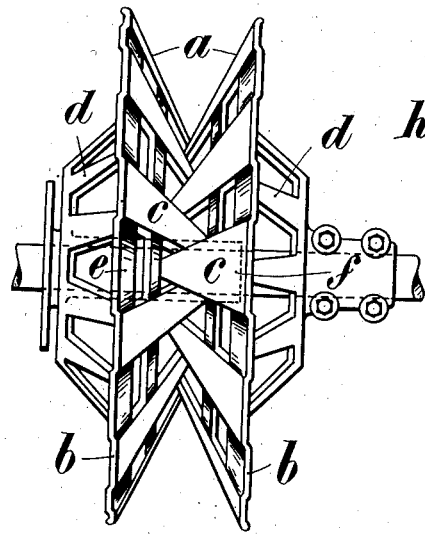
Fig.3.
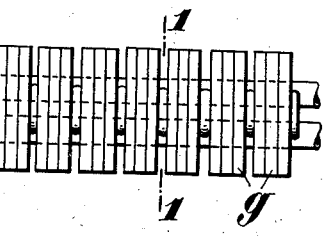
Fig.4.
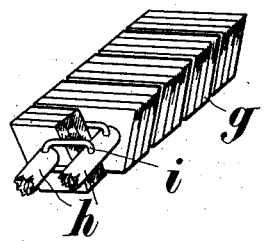
Fig.2.
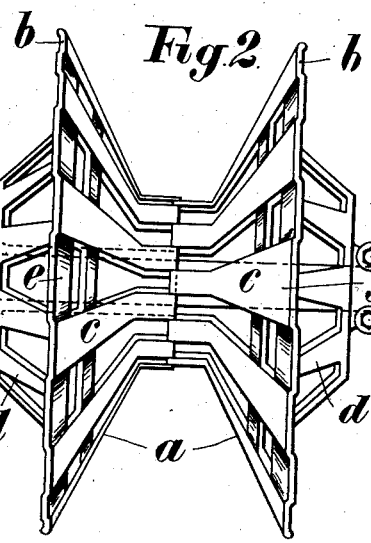
Fig.5.
Fig.6.
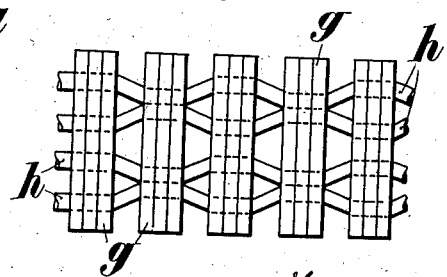
Witnesses
Waldo M. Chapin
William Downau Jr.
Inventor
Gustave Fouillaron.
by
Rosenbaum & Stockbridge
Attys

UNITED STATES PATENT OFFICE.

GUSTAVE FOUILLARON, OF PARIS, FRANCE.

BELT.

No. 902,224.　　　Specification of Letters Patent.　　　Patented Oct. 27, 1908.

Application filed January 22, 1906. Serial No. 297,190.

*To all whom it may concern:*

Be it known that I, GUSTAVE FOUILLARON, a citizen of the French Republic, residing at Paris, France, in the Department of the Seine, have invented certain new and useful Improvements in and Relating to Belts, of which the following is a specification.

My invention relates to a form of belt particularly for use with expanding pulleys of the type having a pair of conical crown members which interlock together in different relations to form a groove for the belt of varying diameter. With pulleys of this class there are presented alternately raised and sunken portions on each side of the pulley groove, and it is desirable to have the belt laterally flexible so as to assume a sinuous form corresponding to the contour of the pulley groove. In this way the belt coöperates with the pulley to give a very high frictional torque; much greater than would be had by an ordinary belt and pulley having a simple circumferential groove. It is the particular object of my invention to provide a belt of the above character which is very strong in addition to its characteristic of lateral flexibility, and furthermore simple and easy to construct.

With this and other objects in view, my invention consists in the features of construction and combination hereinafter set forth and claimed.

In the drawing: Figure 1 is a side view of a pulley adapted to be used with a belt embodying the principles of my invention. Fig. 2 is a view of the same in a relation to present its smallest effective diameter; Fig. 3 is a top view of the belt; Fig. 4 is a section on the line 1—1 of Fig. 3; Fig. 5 is a perspective view of the same; Fig. 6 is a view showing a slightly modified form of belt.

Referring to the drawings in which like parts are designated by the same reference sign, *a* designates the members of the expanding pulleys which are of generally conical outline having outer rims *b* from which project inward the fingers *c* which interlock in the manner clearly shown in Figs. 1 and 2. The portions of the rims *e* between the fingers *c* are depressed so as to produce alternately raised and sunken portions adapted to grasp a belt in a sinuous path. *d* indicates supporting webs or devices for the members *a*. One or both of the parts *d* are made slidable on the shaft *f* so as to adjust the expanding pulley to different effective diameters.

My preferred form of belt is illustrated in Figs. 3, 4 and 5. I provide a plurality of straps *h* on which are assembled trapezoidal plates *g* which may be made of leather or similar material. These plates *g* are assembled into groups as clearly shown in Figs. 3 and 5, in any convenient way, as by the use of intervening wire staples or spacers, *i*. A convenient construction is that shown in which the staples *i* are passed through the straps *h*.

In Fig. 6 a slightly modified construction is shown in which the groups of trapezoidal plates *g* are perforated with holes which are not in alinement with one another for the separate groups so that the straps *h* take a zig zag course along the length of the belt. In passing between the groups of plates *g*, the straps *h* have an inclined direction which necessitates a certain separation of the groups from one another. With either form of belt above described, it is evident that great lateral flexibility is secured on account of the spacing of the groups of plates *g* which have a comparatively free movement limited only by the degree of separation of the separate groups. This space is made to accord with the needs of the expanding pulley so that the belt takes a sinuous form thereabout corresponding to the alternate raised and sunken portions of the faces of the groove.

What I claim, is:—

A belt for use with pulleys of the class described, and comprising a plurality of trapezoidal plates and a plurality of straps passed therethrough, the different plates being assembled in groups upon the straps, the different groups being spaced apart from one another, whereby the belt is flexible laterally so as to be capable of assuming a sinuous form, as and for the purpose set forth.

In testimony whereof I have hereunto set my hand in presence of two subscribing witnesses.

GUSTAVE FOUILLARON.

Witnesses:
　HENRY DANZER,
　LUCIEN CRESPIN.